United States Patent [19]

Workman

[11] Patent Number: 4,660,865
[45] Date of Patent: Apr. 28, 1987

[54] METHOD AND APPARATUS FOR COUPLING A CONNECTOR TO THERMOPLASTIC PIPE

[76] Inventor: Jack L. Workman, No. 7 Spring Run, Alum Creek, W. Va. 25003

[21] Appl. No.: 853,919

[22] Filed: Apr. 21, 1986

[51] Int. Cl.[4] .............................................. F16L 47/00
[52] U.S. Cl. .................................... 285/174; 156/73.5; 285/238; 285/404; 285/419; 285/423
[58] Field of Search ............... 285/112, 238, 404, 403, 285/297, 423, 419, 174, 91, 284; 411/82; 156/73.5, 423

[56] References Cited

U.S. PATENT DOCUMENTS

| | | | |
|---|---|---|---|
| 922,805 | 5/1909 | Nelson et al. | 285/238 |
| 1,446,789 | 2/1923 | Dodd | 285/404 X |
| 1,847,218 | 3/1932 | Lamb | 285/149 |
| 2,559,806 | 7/1951 | Thompson | 285/297 |
| 2,810,594 | 10/1957 | Walsh et al. | 285/908 X |
| 2,882,072 | 4/1959 | Noland | 285/149 X |
| 2,944,839 | 7/1960 | Anderson | 285/45 |
| 3,031,212 | 4/1962 | Oliver | 285/297 X |
| 3,140,884 | 7/1964 | Brauck | 285/404 X |
| 3,160,428 | 12/1964 | Goodall | 285/404 X |
| 3,580,793 | 5/1971 | Hewitt | 156/73.5 X |
| 3,917,497 | 11/1975 | Stickler | 285/423 X |
| 4,039,210 | 8/1977 | Wood et al. | 285/423 X |
| 4,240,652 | 12/1980 | Wong et al. | 285/91 |
| 4,248,460 | 2/1981 | Murray et al. | 285/367 X |
| 4,274,663 | 6/1981 | Becker et al. | 285/134 X |
| 4,326,737 | 4/1982 | Lehmann | 285/112 |

FOREIGN PATENT DOCUMENTS 36977 3/1923 Norway .............................. 285/297

Primary Examiner—Thomas F. Callaghan
Attorney, Agent, or Firm—W. Thad Adams, III

[57] ABSTRACT

A metal or plastic coupling connector (14) is secured to the end portion of a flexible thermoplastic pipe (12) by means of a plurality of thermoplastic plugs (22), (23) (24) which are positioned through access holes (18), (19) and (20) in coupling connector (14) and which are fused to the walls of the flexible plastic pipe (12) to form an integral part thereof. The plugs (22), (23), (24) prevent both longitudinal and rotational movement of coupling connector (14) relative to plastic pipe (12).

12 Claims, 4 Drawing Figures

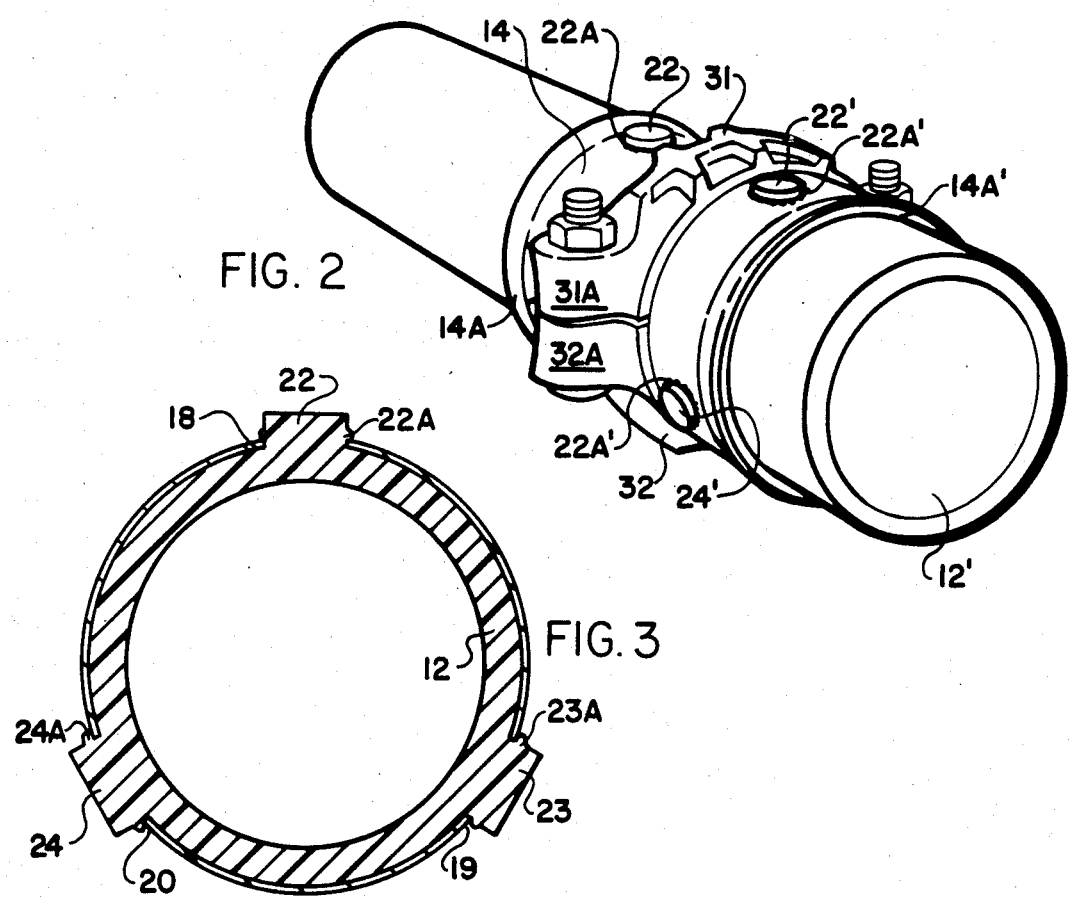
FIG. 2
FIG. 3
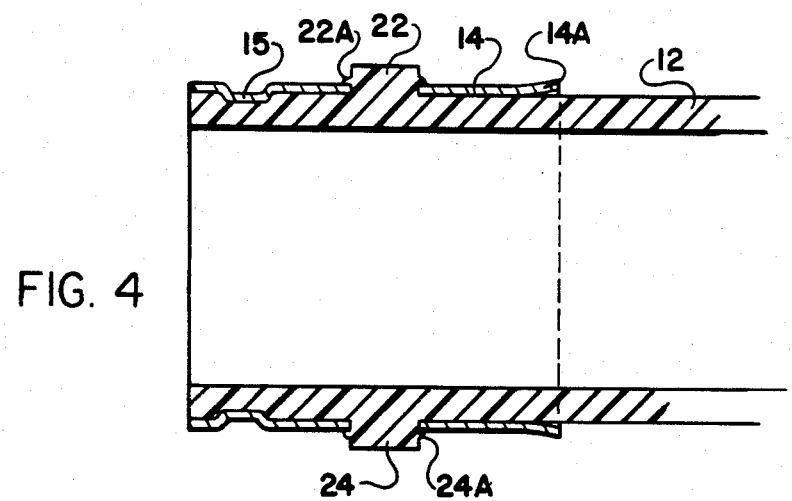
FIG. 4

METHOD AND APPARATUS FOR COUPLING A CONNECTOR TO THERMOPLASTIC PIPE

TECHNICAL FIELD AND BACKGROUND OF THE INVENTION

This invention relates to a pipe construction and, more particularly, to a means for mechanically coupling flexible thermoplastic pipe together. The method and apparatus relates to technology frequently found on the mining, petroleum exploration building sprinkler systems and heavy industry fields. The method and apparatus according to this application solves, in an inexpensive and straightforward manner, problems which have existed in these and similar fields since the advent of thermoplastic pipe as a fluid conveyance medium.

The use of thermoplastic pipe has replaced metal pipe in many applications because of the substantial advantages inherent in plastic pipe products. Thermoplastic pipe is relatively resistant to degradation from environmental contaminants, is lightweight, easy to cut and form, and relatively flexible. However, some of these advantages also create disadvantages when it is necessary to join together lengths of thermoplastic pipe to form longer segments. By definition, thermoplalstic pipe is relatively sensitive to the application of heat. While in many respects this is an advantage, one disadvantage resulting from this property is the substantial amount of expansion and contraction which can take place along a relatively long length of thermoplastic pipe caused by environmental conditions, i.e., air temperature, direct exposure to sunlight and the temperature of the fluid being transferred through the pipe. Numerous expensive and complicated methods and products have been proposed for joining segments of thermoplastic pipe together. One of these prior art methods is thermal butting or socket fusing segments of the pipe together. However, this ordinarily requires semi-skilled workmen and a suitable environment with relatively clean and dry work conditions. Therefore, this method of coupling is not entirely satisfactory for use in many production environments.

Alternatively, rigid inserts made of metal or rigid plastic are used to mechanically couple sections of flexible thermoplastic pipe with an outside clamp-type connector. These inserts reduce the inside diameter of the pipe and very often are not compatible with the liquid, slurry or gas flowing through the pipe. Also, the inside diameter of the pipe often does not exactly match the diameter of the insert rendering the pipe unsatisfactory for use with inserts. Thermoplastic pipe diameters and wall thicknesses in the past few years have increased substantially as thermoplastic pipe has been adapted to more severe operating conditions. Using the insert method to connect larger diameter and thicker-walled thermoplastic pipe together has in many instances become impractical.

Another method is to roll-groove or cut-groove the ends of thermoplastic polyethylene sections for joining with a roll or cut-groove coupling. In some stable, non-severe environments, this is a viable alternative.

This involves the formation, either by molding or cutting, of an annular groove near the end of a plastic pipe to be joined. Two such formed pipes are joined (or very nearly joined) end to end and are then connected together by means of a clamp which includes an annular rim on opposite sides, one of which mates into the groove of one of the sections of pipe. The clamp is tightly secured around the pipe and the rims hold the pipe together against movement along the axis of the pipe by engagement with the pipe grooves. This type of clamp allows for some expansion and contraction, deflection and a certain amount of vibration and noise absorption. In addition, gaskets of various pipes can be used to fluidly seal the pipe joint.

Finally, other mechanical couplings exist which have internal sharp teeth which penetrate into the outside surface of the pipe wall. These mechanical couplings are used primarily for low pressure applications. Use of these couplings with high pressures at or near the maximum pipe pressure rating or with end-pull due to the creep of thermoplastic polyethylene expansion and contraction causes the teeth to gradually cut through the pipe. This is a particular problem since polyethylene "cold flows." This simply means that the amorphous molecular structure of the plastic moves in response to stress, even when the pipe itself appears to be in a completely solid state.

SUMMARY OF THE INVENTION

Therefore, it is an object of the invention to provide a method and apparatus for coupling together thermoplastic pipe.

It is another object of the invention to provide a method and apparatus of connecting together thermoplastic pipe which prevents relative rotation and movement along the longitudinal axis between two joined sections of thermoplastic pipe.

It is another object of the invention to provide a method and apparatus of joining together thermoplastic pipe which permits the continued use of known coupling connectors when desired or necessary.

It is another object of the present invention to provide a method and apparatus of joining together thermoplastic pipe which can be used in combination with known roll-groove connecting technology.

These and other objects and advantages of the present invention are achieved by providing a connecting coupler for thermoplastic pipe which includes a tubular connector sleeve having means for use in connection with another sleeve, said connector sleeve being concentrically positioned in press-fit relation on an end portion of a length of thermoplastic pipe. The tubular connector sleeve has at least one access hole through its walls for permitting access to the wall of the plastic pipe directly therebeneath. A thermoplastic plug is positioned in and protrudes outwardly from the at least one access hole. The plug is heat fused to the wall of the thermoplastic pipe to form an integral bond therewith for locking the connector sleeve on the thermoplastic pipe against both relative longitudinal and rotational movement.

Preferably, the connector sleeve includes a plurality of equidistantly spaced-apart access holes around the periphery thereof for permitting access to the wall of the thermoplastic pipe directly beneath each such access hole.

According to one embodiment of the invention, the bottom of each plug is contoured to conform to the curve of the outer wall of the thermoplastic pipe to which it will be heat fused.

In accordance with the method of the invention, a coupling connector for a thermoplastic pipe is formed by placing a tubular connector sleeve having at least one access hole through the walls thereof in press-fit relation on an end portion of the thermoplastic pipe. A thermoplastic plug is then placed in an access hole in the tubular connector sleeve, the plug having a length sufficient so that, when the plug is in contact with the wall of the plastic pipe through the access hole, it protrudes outwardly above the surface of the connector sleeve.

Then, the plastic plug is heat fused to the wall of the thermoplastic pipe to form an integral bond therewith. The plug thereby locks the connector sleeve on the thermoplastic pipe against both relative longitudinal and rotational movement.

According to a preferred embodiment of the invention, the method includes the step of flaring one end of the connector sleeve to assist in placing the sleeve on the end portion of the thermoplastic pipe.

BRIEF DESCRIPTION OF THE DRAWINGS

Some of the objects of the invention have been described above. Other objects and advantages of the invention will proceed when taken in connection with the following drawings, in which:

FIG. 2 is a perspective view, in unitary form, of the piping arrangement shown in FIG. 1;

FIG. 3 is a lateral cross-sectional view through the coupling connector, plastic pipe and integrally joined locking plugs; and FIG. 4 is a longitudinal cross-sectional view of the plastic pipe, coupling connector and integrally joined locking plug.

DETAILED DESCRIPTION OF THE PREFERRED EMBODIMENT

Figure 1:
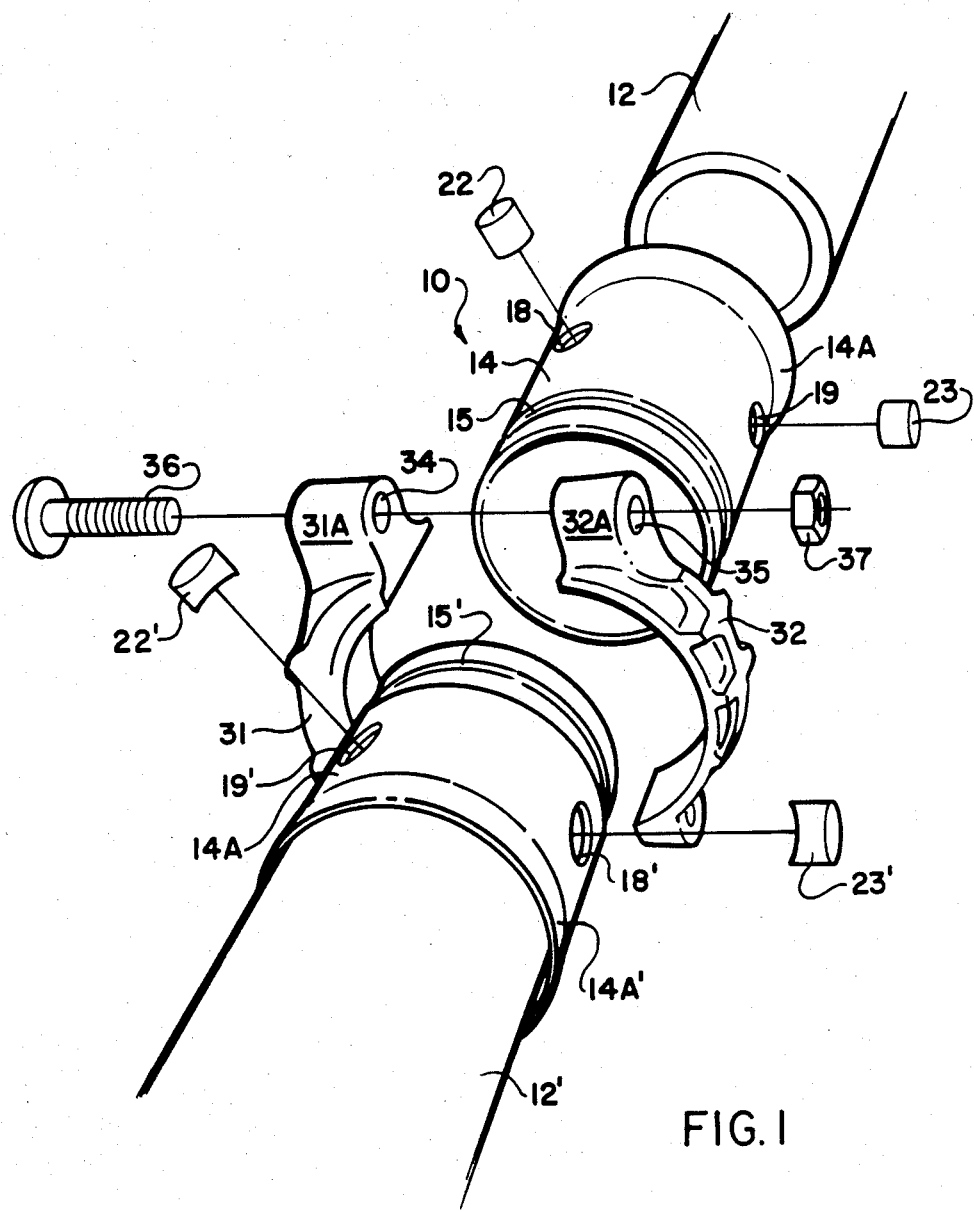
FIG. 1 is a partially exploded view showing the connection according to the invention of two annular coupling connectors to respective thermoplastic pipe and the connection of the two thermoplastic pipe end-to-end by means of a roll-groove coupling.

Referring now specifically to the drawings, the invention will be explained with primary reference to two constructions according to the present invention, by which two lengths of of pipe will be joined together. Referring now to FIG. 1, coupling connectors 10 and 10' according to the present invention is shown in partial fragmentary form and in FIG. 2 in a more complete, exploded form.

By use of the invention, two lengths of thermoplastic pipe 12 and 13 are to be joined together. The thermoplastic pipes 12 and 12' may be manufactured from thermoplastic flexible resin polyethylene, polypropylene, polybutylene, or copolymers of these resins and other thermoplastic materials. Connector sleeves 14 and 14' having somewhat flared ends 14A and 14A' respectively are positioned on end portion of plastic pipe 12 and 12'. The connector sleeve 14 may be formed of stainless or coated steel or, for less severe applications, rigid plastic. Further references are primarily to the construction of coupling connector 10, although it will be appreciated that the description relates as well to the identical coupling connector 10. Near the end of connector sleeve 14 opposite the flared portion 14A is formed an annular groove 15 of reduced diameter. This groove is formed either by rolling, by which process the removal of metal from the sleeve is avoided or by cutting the groove into the wall of the pipe.

If desired, pipe 12 may be spun while the connector sleeve 14 is held stationary in a chuck or vise. By rapidly spinning pipe 12 within metal connector 14, the plastic is heated, softened and is permitted to flow into intimate contact with the inner wall of connector sleeve 14, particularly around the area defined by the groove 15. This results in a very secure and close fitting connection between connector sleeve 14 and pipe 12. However, by practicing the invention described in this application, it has been determined that in many applications this process is unnecessary.

Several access holes are formed through the walls of connector sleeve 14. Connector sleeve 14 has three such holes, 18, 19 and 20 (see FIG. 3). These holes 18, 19 and 20, provide direct access to the surface of plastic pipe 12 directly therebeneath. Thermoplastic plugs 22, 23 and 24 are positiond in access holes 18, 19 and 20, respectively, and are fused to plastic pipe 14, forming an integral bond. This can be done in one of two ways. Preferably, one end of each plug is heated to a temperature of 425°–500° F. (218°–260° C.) with a teflon-coated heater. At the same time, the wall of plastic pipe 12 through access holes 18, 19 and 20 is heated to approximately 425°–500° F. (218°–260° C.). At this tempeature, the plastic becomes a semi-liquid amorphous mass which, when joined, combines as does a liquid to form a unitary, integrally joined structure.

Alternatively, plugs 22, 23 and 24 can be attached by spin welding. This involves placing plugs 22, 23 and 24 in a chuck of a drill and spinning the plug rapidly as it is pressed against the wall of plastic pipe 12 through access holes 18, 19 and 20, respectively. Friction between the two structures rapidly causes an elevation in temperature to the range of 425°–500° F. (218°–260° C.), causing the plastic to form a semi-liquid amorphous mass which intermingles in the manner described above. When the plastic cools, an integral bond is formed.

According to one embodiment of the invention, the plugs 22, 23 and 24 are contoured to the outside diameter of the plastic pipe to which they will be joined. This process would likely be used in smaller pipe diameter sizes such as those 3, 4, 6 and 8 inches (7.6, 10, 15 and 20 cm) in diameter. Ordinarily, the diameter of the plugs remains the same, without regard to the size of pipe. Therefore, the smaller diameter pipes, such as described above, contain a greater arc across the width of the plug, making contouring desirable to insure a complete, uniform fit across the entire bottom surface of the plug. For larger diameter pipes, the degree of arc beneath the plug is sufficiently slight so that the semi-liquification of the bottom end of the plug is sufficient to contour the plug to the wall of the pipe as the joinder is made.

Ordinarily, the plugs should extend upwardly above the outer surface of connector sleeve 14 by approximately ⅛ to ¼ inch (0.3–0.64 cm).

As can best be observed with reference to FIGS. 3 and 4, the plugs 22, 23, 24, while soft, are compressed slightly causing compression against sleeve 14 which, in turn, creates an annular bead 22A, 23A, 24A, respectively, which locks plugs 22, 23 and 24 into fixed relation with sleeve 14. The number of plugs is dependent primarily on the size of the plastic pipe to which the connector sleeve is to be affixed. On pipe sizes up to approximately 3 inches (7.6 cm), two buttons, diametrically opposed, is sufficient. Pipe sizes between 3 and 6 inches (7.6–15 cm) would be connected to connector sleeves by using three plugs. Six inch (15.2 cm) diameter and greater pipes would require four plugs, or perhaps for very large sizes even more.

By referring again to FIGS. 3 and 4, the secure manner in which plastic pipe 12 is locked against rotation (FIG. 3) relative to connector sleeve 14 and movement along the longitudinal axis (FIG. 4) can be seen. With continued reference to FIG. 4, note that plastic pipe 12 is further secured against axial longitudinal movement by the roll-groove 15.

As is shown in FIG. 1, once sleeves 14 and 14' have been secured to pipes 12 and 12' the two pipes 12 and 12' themselves are connected to each other by means of a clamp-type coupling, such as a Style 77 coupling made by Victaulic Company of America. As is shown in FIG. 1, coupling 30 comprises two hemispherical coupling halves 31 and 32 joined at their diametric opposite ends by integrally formed connecting heads 31A, 32A having throughbores 34, 35 therein. An oval-shaped trackhead bolt 36 is positioned through bores 34 and 35 on each end of coupling halves and secured with a nut 37. Use of the oval shaped trackhead bolt design permits tightening of the nuts from one side with a single wrench. While not specifically shown, the end portions through which bolt 36 extends has an oval bolt recess which receives an oval neck positioned below the bolt head. This prevents the head from turning as the nut 37 on the other side is tightened. The completed connection is shown in FIG. 2. The connection formed by the invention disclosed above is simple, lightweight, easy to form and yet results in a much stronger and reliable connection than has heretofore been possible.

A method and apparatus for connecting a coupling connector to thermoplastic pipe is disclosed above. Various details of the invention may be changed without departing from its scope. Furthermore, the foregoing description of the preferred embodiment according to the present invention is provided for the purposes of illustration only and not for the purpose of limitation—the invention being defind by the claims.

I claim:

1. A coupling connector for thermoplastic pipe, comprising:
   (a) a tubular connector sleeve having means for use in connection to another sleeve, said tubular connector sleeve being concentrically positioned in press-fit relation on an end portion of a length of thermoplastic pipe and having at least one access hole through the walls thereof for permitting access to the wall of the plastic pipe directly therebeneath; and
   (b) a thermoplastic plug positioned in and protruding outwardly from said at least one access hole, said plug heat fused to the wall of the thermoplastic pipe to bond with and form an integral, unitary, fixedly secured part thereof for locking said connector sleeve on said thermoplastic pipe against both longitudinal and rotational movement relative thereto.

2. A coupling connector according to claim 1, wherein said sleeve includes an annular recess around the periphery thereof for receiving a locking coupler for coupling the sleeve to another sleeve having a like annular recess.

3. A coupling connector according to claim 1, wherein the end of said connector sleeve innermost on said thermoplastic pipe includes a flared opening to assist insertion of said thermoplastic pipe therein.

4. A coupling connector according to claim 1, wherein said connector sleeve is formed of metal.

5. A coupling connector according to claim 1, wherein said tubular connector sleeve is formed of a thermoplastic material.

6. A coupling connector according to claim 1, wherein said connector sleeve includes a plurality of spaced-apart access holes around the periphery thereof for permitting access to the wall of the thermoplastic pipe directly beneath each such access hole and wherein a thermoplastic plug is positioned in and protrudes outwardly from each of said access holes and is heat fused to the wall of the thermoplastic pipe to form an integral bond therewith.

7. A coupling connector according to claim 1, wherein said thermoplastic pipe is conformed to the inside of said tubular connector sleeve by rapidly spinning the pipe in the connector sleeve to generate sufficient friction to heat and soften the plastic pipe and allow the surface of the plastic pipe to flow and solidify when cooled into intimate contact with the contours of the inner wall of the connector sleeve.

8. A method of forming a coupling connector for a thermoplastic pipe, comprising the steps of:
   (a) placing a tubular connector sleeve having at least one access hole through the walls thereof in press-fit relation on an end portion of thermoplastic pipe;
   (b) placing in said at least one access hole a thermoplastic plug having a length sufficient so that, when said plug is in contact with the wall of the plastic pipe through said access hole, it protrudes outwardly above the outer surface of the connector sleeve; and
   (c) heat fusing the plastic plug to the wall of the thermoplastic pipe to bond with and form an integral, unitary, fixedly secured part thereof whereby the plug locks against both longitudinal and rotational movement relative thereto.

9. A method according to claim 8, and including the step of flaring one end of the connector sleeve to assist in placing the sleeve on the end portion of the thermoplastic pipe.

10. A method according to claim 8, and including the step of spinning the plastic pipe within the tubular sleeve to generate sufficient friction to heat and soften the plastic of the thermoplastic pipe and allow the surface of the thermoplastic pipe to flow and solidify when cooled into intimate contact with the contours of the inner wall of the connector sleeve.

11. A method according to claim 8, wherein said tubular sleeve includes an annular recess for receiving a locking coupler for coupling the sleeve to another like sleeve.

12. A method according to claim 8, wherein said method includes the step of contouring the bottom of the plastic plug to conform to the curve of the outer wall of the thermoplastic pipe to which it will be heat fused.

* * * * *